United States Patent
Kuehner et al.

(10) Patent No.: US 11,485,233 B2
(45) Date of Patent: Nov. 1, 2022

(54) DEVICE FOR ENTERING INFORMATION BY PRESSING AND/OR ROTATING AN OPERATING ELEMENT

(71) Applicant: Dr. Ing. h.c. F. Porsche Aktiengesellschaft, Stuttgart (DE)

(72) Inventors: Manuel Kuehner, Kornwestheim (DE); Marco Vitello, Weil der Stadt (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 519 days.

(21) Appl. No.: 16/442,598

(22) Filed: Jun. 17, 2019

(65) Prior Publication Data
US 2020/0001719 A1    Jan. 2, 2020

(30) Foreign Application Priority Data
Jun. 29, 2018  (DE) .................. 10 2018 115 760.6

(51) Int. Cl.
*B60K 37/06* (2006.01)
*B60K 35/00* (2006.01)

(52) U.S. Cl.
CPC .............. *B60K 37/06* (2013.01); *B60K 35/00* (2013.01); *B60K 2370/126* (2019.05); *B60K 2370/1446* (2019.05); *B60K 2370/341* (2019.05)

(58) Field of Classification Search
CPC ............................... B60K 37/06; B60K 35/00; B60K 2370/1537; B60K 2370/1446; B60K 2370/1434; B60K 2370/1523; B60K 2370/341; B60K 2370/126
See application file for complete search history.

(56) References Cited

U.S. PATENT DOCUMENTS

| 5,187,630 A * | 2/1993 | MacKay .............. G11B 15/103 360/137 |
| 2016/0364014 A1 | 12/2016 | Dietz et al. |
| 2018/0154774 A1* | 6/2018 | Park .................. G02B 27/0101 |
| 2019/0278386 A1* | 9/2019 | Masthoff ................. G06F 3/041 |

FOREIGN PATENT DOCUMENTS

| DE | 102015210657 B4 | 12/2016 |
| DE | 102015110634 A1 | 1/2017 |

* cited by examiner

*Primary Examiner* — Christopher E Leiby
(74) *Attorney, Agent, or Firm* — Leydig, Voit & Mayer, Ltd.

(57) ABSTRACT

A device for entering information includes an operating element and a control device. The device further includes an angle encoder configured to detect a rotational movement about an axis of rotation of the operating element, a touch encoder configured to detect a pressure movement of the operating element, and a transmission element configured to transmit data from the angle encoder and/or from the touch encoder to the control device. In addition, the device includes an energy transmission device configured to supply energy to the operating element via a cable-free transmission of energy.

15 Claims, 1 Drawing Sheet

_DEVICE FOR ENTERING INFORMATION BY PRESSING AND/OR ROTATING AN OPERATING ELEMENT_

CROSS REFERENCE TO RELATED APPLICATIONS

This application claims benefit to German Patent Application No. DE 10 2018 115 760.6, filed Jun. 29, 2018, which is hereby incorporated by reference herein.

FIELD

The present invention relates to a device for entering information by pressing and/or rotating an operating element, in particular a rotate-and-press actuator.

BACKGROUND

Devices for entering information by pressing and/or rotating an operating element are in principle known from the prior art, in particular from the vehicle operation sector. Rotate-and-press actuators permit the convenient entry of information. Thus, for example, air temperature and air flow speed of a vehicle air-conditioning system, local designations relating to navigation with a navigation system or radio transmitters for playback with the car radio can be set. The combination of rotation and pressing is advantageous inasmuch as with the rotation a value for a parameter to be set can be selected, and the selected value can be confirmed with the pressing.

Classically, rotate-and-press actuators are constructed as mechanical elements, which pass on the pressing and rotation via a shaft to a touch encoder or an angle encoder. From there, the signals are passed on via electric conductor tracks to a control device, for example a control device of the air conditioning system.

SUMMARY

In an embodiment, the present invention provides a device for entering information. The device includes an operating element and a control device. The device further includes an angle encoder configured to detect a rotational movement about an axis of rotation of the operating element, a touch encoder configured to detect a pressure movement of the operating element, and a transmission element configured to transmit data from the angle encoder and/or from the touch encoder to the control device. In addition, the device includes an energy transmission device configured to supply energy to the operating element via a cable-free transmission of energy.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
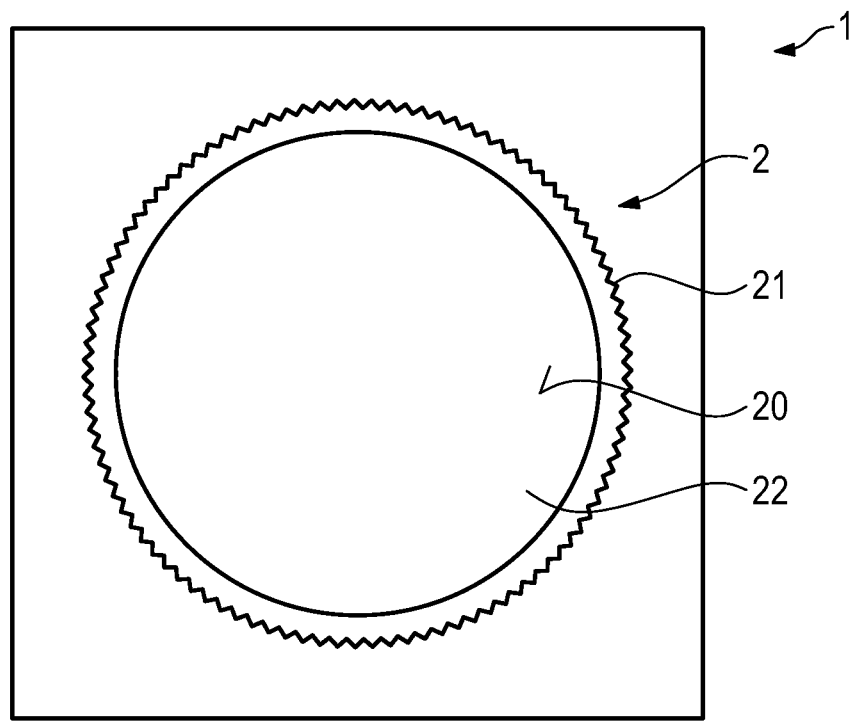
FIG. 1 illustrates schematically a device according to an embodiment of the present invention.

Disadvantageous in prior art rotate-and-press actuators are the comparatively large overall space needed by the shaft and the inflexible positioning ability.

A further possible way of configuring rotate-and-press actuators is to position the same as knobs on a touch display and, during a rotational movement of the rotate-and-press actuator, to have the latter swipe over the touch display with a contact element. The disadvantage with this prior art is that the possibility of transmitting energy to the knob for operating electrical devices in the knob is only very awkwardly and restrictedly possible.

The present invention provides a device for entering information which does not have certain disadvantages of the prior art but is flexible with regard to energy supply and positioning ability.

A device for entering information is described herein, the device having an operating element, a transmission element, an energy transmission device for the energy supply of the operating element, and a control device, the device having an angle encoder for detecting a rotational movement about an axis of rotation of the operating element and a touch encoder for detecting a pressure movement of the operating element, the transmission element being a device for transmitting data from the angle encoder and/or from the touch encoder to the control device, characterized in that the energy transmission device is suitable for the cable-free transmission of energy.

The device according to the invention makes it possible to supply a rotate-and-press actuator with energy in a cable-free manner. Therefore, supply cables, which restrict the positioning ability of the device, for example in a vehicle cockpit, and the material selection of the base of the device, are dispensed with.

According to a preferred embodiment of the invention, provision is made for the energy transmission device to be configured for the inductive transmission of energy. This permits an efficient and economical energy supply of the operating element.

For this purpose, the operating element can have one or more receiver coils. The energy transmission device can also have a receiver-side part which has one or more receiver coils, and a transmitter-side part which has one or more transmitter coils. Preferably, the receiver-side part is arranged in the operating element. Also preferably, the transmitter-side part is arranged in, on or under a dashboard of a vehicle. The transmitter-side part can also have devices for influencing an electromagnetic field, wherein the devices for influencing an electromagnetic field are preferably devices for concentrating an electromagnetic field.

According to a further preferred embodiment of the invention, provision is made for the operating element to be implemented in the form of a rotary knob, wherein the rotary knob has a touch surface substantially along a main plane of extent orthogonal to the axis of rotation, wherein the rotary knob has a lateral edge substantially orthogonal to the main plane of extent.

This advantageously permits the entry of information with the human hand. The lateral edge preferably has a structured surface. The rotary knob can be rotated stepwise about the axis of rotation. For this purpose, the rotary knob can latch in after each step of the stepwise rotation.

According to a further preferred embodiment of the invention, provision is made for the angle encoder to be integrated in the operating element. This permits a compact design in which no shaft projecting beyond the operating element is needed to transmit the rotation to the angle encoder.

According to a further preferred embodiment of the invention, provision is made for the angle encoder to be arranged in the region between the touch surface and the lateral edge. This permits the device to be configured more compactly and therefore so as to be able to be positioned more flexibly.

According to a further preferred embodiment of the invention, provision is made for the touch encoder to be arranged in the region between the touch surface and the lateral edge. This advantageously permits the detection of pressure movements to be integrated in the operating element. The result is a further reduction in size and a still more compact design.

According to a further preferred embodiment of the invention, provision is made for the operating element to be arranged on a capacitive pressure sensor of the device. This permits the simple implementation of the touch encoder. Preferably, the capacitive pressure sensor is the touch encoder. As a result of pressure on the operating element, the operating element comes closer to the capacitive pressure sensor, the latter detecting the movement of the operating element.

According to a further preferred embodiment of the invention, provision is made for the capacitive pressure sensor to be a touch display. This makes it possible to inform a user of the device directly on the device about an operating state of the device, in particular about an operating state of the control device. At the same time, it helps the user to find the correct device for entering information quickly and reliably which, when the device is installed in a vehicle, results in less distraction in the road traffic.

According to a further preferred embodiment of the invention, provision is made for the transmission element to be an element for the wire-free transmission of information. It is thus advantageously possible to connect the operating element to the control device entirely without cables. As a result, high flexibility in the positioning of the operating element is achieved. Furthermore, during the installation of the device, for example in a vehicle, complicated working steps are dispensed with as a result of the fact that no cables have to be drawn and connected.

The transmission element can have a first radio interface in the operating element and a second radio interface on the control device for this purpose. Data can be transmitted between the first radio interface and the second radio interface by radio. For this purpose, the data can be transmitted by means of Bluetooth, WLAN or NFC. However, the transmission element can have a first optical interface in the operating element and a second optical interface on the control device. Data can be transmitted optically between the first optical interface and the second optical interface.

According to a further preferred embodiment of the invention, provision is made for the device to have illumination for illuminating the rotary knob. The illumination can be controllable by the control device. For this purpose, the control device can control brightness and/or color of the illumination. The touch surface and/or the lateral edge can have indicating elements, preferably displays, the indicating elements being particularly preferably controllable by the control device.

According to a further preferred embodiment of the invention, provision is made for the energy transmission device to be configured for the energy supply of the angle encoder and/or the touch encoder and/or the transmission element and/or the illumination.

The invention also provides a method for operating a device for entering information, rotary information as a result of rotating the operating element being detected by an angle encoder, touch information as a result of a pressure movement on an operating element being detected by a touch encoder, wherein the rotary information and the touch information are transmitted from the transmission element to a control device.

The method according to the invention permits the operation of a device for entering information that is flexible to position and space-saving.

According to a preferred embodiment of the invention, provision is made for the rotary information and the touch information to be transmitted from the transmission element to the control device in a wire-free manner. The rotary information and the touch information can be transmitted by radio via Bluetooth, NCF or WLAN. However, the rotary information and the touch information can also be transmitted optically.

According to a preferred embodiment of the invention, provision is made for energy to be transmitted inductively by the energy transmission device. For this purpose, energy can be transmitted from one or more transmitter coils to one or more receiver coils. For this purpose, an electromagnetic field can be influenced by a device for influencing the electromagnetic field, preferably concentrated.

According to a preferred embodiment of the invention, provision is made for the operating element to be illuminated by the illumination. The illumination can be controlled by the control device and that, for this purpose, control commands are transmitted from the control device to the illumination via the transmission element.

In FIG. 1, the device 1 according to an exemplary embodiment of the present invention is illustrated schematically. The device has the operating element 2, which is implemented as a rotary knob having the lateral edge 21 and the touch surface 20. The lateral edge 21 has a structured surface, which facilitates the operation. Furthermore, the indicating element 22 is arranged on the touch surface 20 in the form of a display.

Figure 2:
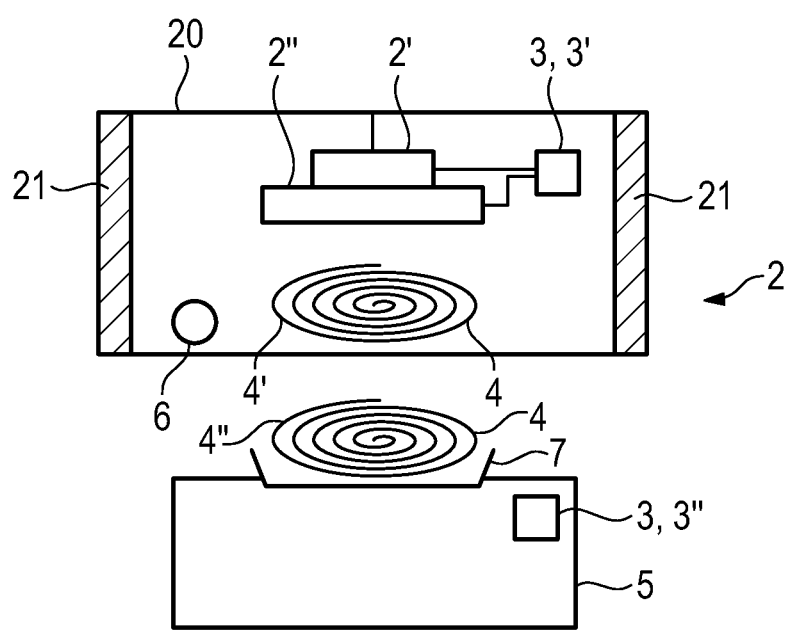
FIG. 2 illustrates schematically a section through a device according to an embodiment of the present invention.

FIG. 2 shows schematically a section through the device 1 according to an exemplary embodiment of the present invention. The section shown is orthogonal to the view of the device 1 in FIG. 1.

The device 1 has the operating element 2 and the control device 5. The operating element 2 has the lateral edge 21 and the touch surface 20. The angle encoder 2' and the touch encoder 2" are arranged in the interior of the operating element 2. The angle encoder 2' detects rotary movements of the operating element 2 with an axis of rotation orthogonal to the touch surface 20. The touch encoder 2" detects pressure movements with a pressure parallel to the surface normal of the touch surface 20. The data detected is conducted from the angle encoder 2' and from the touch encoder 2" to the transmission element 3. The transmission element 3 has the first radio interface 3' and the second radio interface 3". The detected data is transmitted via Bluetooth from the first radio interface 3' in the operating element 2 to the second radio interface 3" in the control device 5. The energy supply of the operating element 2 is carried out inductively via the energy transmission device 4. For this purpose, the energy transmission device 4 has the receiver coil 4' in the interior of the operating element 2 and the transmitter coil 4". The angle encoder 2', the touch encoder 2", the first radio interface 3' and the illumination 6 which illuminates the operating element 2 from inside are supplied with energy by the receiver coil 4'. In order to improve the energy transmission from the transmitter coil 4" to the receiver coil 4', the device for influencing the electromagnetic field 7 has, which concentrates the electromagnetic field generated by the transmitter coil 4" in the direction of the receiver coil 4'.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for entering information, the device comprising:
    an operating element;
    a control device;
    an angle encoder configured to detect a rotational movement about an axis of rotation of the operating element;
    a touch encoder comprising a capacitive pressure sensor and configured to detect a pressure movement of the operating element;
    a first radio interface arranged in the operating element and configured to transmit data from the angle encoder and/or from the touch encoder to a second radio interface arranged in the control device;
    a first electromagnetic coil arranged in the operating element; and
    a second electromagnetic coil configured to supply energy from the control device to the first electromagnetic coil arranged in the operating element via a cable-free transmission of energy, wherein
    the operating element includes a rotary knob with a touch surface substantially along a main plane of extent orthogonal to the axis of rotation, the rotary knob having a lateral edge substantially orthogonal to the main plane of extent,
    the angle encoder and the touch encoder are arranged within the operating element, and
    the angle encoder is arranged between the touch surface and the touch encoder.

2. The device as claimed in claim 1, wherein the second electromagnetic coil is configured to supply energy from the control device to the first electromagnetic coil in the operating element via an inductive transmission of energy.

3. The device as claimed in claim 1, wherein the angle encoder is integrated in the operating element.

4. The device as claimed in claim 1, wherein the angle encoder is arranged in a region between the touch surface and the lateral edge.

5. The device as claimed in claim 1, wherein the touch encoder is arranged in a region between the touch surface and the lateral edge.

6. The device as claimed in claim 1, wherein the capacitive pressure sensor is a touch display.

7. The device as claimed in claim 1, wherein the first and second radio interfaces are configured to provide wire-free transmission of information between the operating element and the control device.

8. The device as claimed in claim 2, wherein the device has illumination for illuminating the rotary knob.

9. The device as claimed in claim 8, wherein the illumination is integrated in the rotary knob.

10. The device as claimed in claim 1, wherein the first electromagnetic coil device is configured to supply energy to the angle encoder and/or the touch encoder and the first radio interface and/or the illumination.

11. A method for operating a device for entering information, the method comprising:
    providing a touch encoder, a touch surface, and an angle encoder between the angle touch encoder and the touch surface;
    detecting, by the angle encoder, rotary information as a result of rotation of an operating element;
    detecting, by the touch encoder, touch information as a result of a pressure movement on the operating element,
    transmitting, by a first radio interface arranged in the operating element, the rotary information and the touch information to a second radio interface arranged in a control device, and
    supplying energy from the control device to the operating element via a cable-free transmission of energy, the energy being transmitted to a first electromagnetic coil in the operating element from a second electromagnetic coil of the control device.

12. The method as claimed in claim 11, wherein the rotary information and the touch information are transmitted from the first radio interface to the second radio interface arranged in the control device in a wire-free manner.

13. The method as claimed in claim 11, wherein energy is transmitted inductively by the second electromagnetic coil.

14. The method as claimed in claim 11, wherein the operating element is illuminated by illumination.

15. A device for entering information, comprising:
    an operating element, comprising:
        at least one lateral edge parallel to an axis of rotation of the operating element;
        a touch surface substantially along a main plane of extent orthogonal to the axis of rotation, the operating element having a lateral edge substantially orthogonal to the main plane of extent;
        a touch encoder comprising a capacitive pressure sensor and configured to detect a pressure movement of the operating element;
        an angle encoder configured to detect a rotational movement of the operating element about the axis of rotation, the angle encoder being arranged between the touch surface and the touch encoder;
a first radio interface; and
a first electromagnetic coil; and a control device, comprising:
a second radio interface; and
a second electromagnetic coil, wherein the first radio interface of the operating element is configured to transmit data from the angle encoder and the touch encoder to the second radio interface, and wherein the second electromagnetic coil is configured to supply energy from the control device to the first electromagnetic coil of the operating element via cable-free transmission of energy.

* * * * *